United States Patent [19]

Staab

[11] Patent Number: 4,603,118

[45] Date of Patent: Jul. 29, 1986

[54] PROCESS FOR THE PREPARATION OF A CATALYTICALLY ACTIVE ELECTRODE MATERIAL FOR OXYGEN-CONSUMING ELECTRODES

[75] Inventor: Rudolf Staab, Kelkheim, Fed. Rep. of Germany

[73] Assignee: Hoechst Aktiengesellschaft, Fed. Rep. of Germany

[21] Appl. No.: 752,480

[22] Filed: Jul. 3, 1985

Related U.S. Application Data

[63] Continuation of Ser. No. 576,113, Feb. 2, 1984, abandoned.

[30] Foreign Application Priority Data

Feb. 4, 1983 [DE] Fed. Rep. of Germany ....... 3303779

[51] Int. Cl.$^4$ ...................... H01M 4/88; H01M 4/04; C25B 11/08; C25B 1/34
[52] U.S. Cl. .................................... 502/101; 204/280; 204/291; 427/115; 427/222; 428/403; 429/42; 502/159
[58] Field of Search .................. 502/101, 159; 429/42; 204/291, 280; 427/115, 217, 222

[56] References Cited

U.S. PATENT DOCUMENTS

| | | | |
|---|---|---|---|
| 3,635,761 | 1/1972 | Haag et al. | 427/217 |
| 3,940,510 | 2/1976 | Hohme et al. | 427/217 |
| 4,113,658 | 9/1978 | Geus | 502/309 |
| 4,348,429 | 9/1982 | McIntyre et al. | 427/125 |

Primary Examiner—P. E. Konopka
Attorney, Agent, or Firm—Connolly and Hutz

[57] ABSTRACT

Metallic silver is deposited from a silver salt solution onto a support by reduction, and thus a catalytically active electrode material for oxygen-consuming electrodes is obtained. For this purpose, (a) an aqueous dispersion of a hydrophobic polymer, in particular a dispersion of PTFE,
(b) a silver salt solution and
(c) reducing agent for silver ions are mixed. During this, a pH at which the dispersion employed is stable, and the silver salt is reduced, should be maintained.

13 Claims, No Drawings

PROCESS FOR THE PREPARATION OF A CATALYTICALLY ACTIVE ELECTRODE MATERIAL FOR OXYGEN-CONSUMING ELECTRODES

This is a continuation of application Ser. No. 576,113 filed Feb. 2, 1984 and now abandoned.

The present invention relates to a process for the preparation of a catalytically active electrode material, which is based on silver, for oxygen-consuming electrodes which are suitable for use in electrochemical cells, in particular alkali metal chloride electrolysis cells and fuel cells.

It is known that finely divided metallic silver is suitable as a catalyst for reducing oxygen in air-consuming cathodes for alkali metal chloride electrolysis. The chemical reaction on which this is based follows the equation $$4e^- + O_2 + 2H_2O \rightarrow 4OH^-$$

Theoretically, when an oxygen-consuming cathode is used for alkali metal chloride electrolysis, the required cell voltage decreases by 1.23 V compared with electrolysis cells in which hydrogen is liberated at the cathode.

Thus, there is considerable interest in employing electrodes of this type in industrial alkali metal chloride electrolysis in order to save electrical energy. In particular, it should be possible to operate electrodes of this type using air as the oxidizing agent even for lengthy periods.

The known processes for the preparation of air cathodes of this type involve a large number of process steps. By the process of German Pat. No. 2,713,855, initially a catalyst is prepared by simultaneous reduction of a silver salt and a mercury salt in the presence of a metal hydroxide. This catalyst is reduced in size and then mixed, using vibrators, with a suspension of dispersed asbestos fibers and a polytetrafluoroethylene latex, suspended and finally converted into a flat-shaped article (electrode).

Other processes are ultrasonic baths, cross hammer mills or choppers for the reduction in size of the silver catalyst.

After the reduction in size of the catalyst, it is necessary in all cases to make it hydrophobic so that a three-phase interface comprising the catalyst, the $O_2$ to be reduced and the electrolyte can form in the finished electrode. Oxygen is hardly able to react at an electrode which is insufficiently hydrophobic. In order to improve the internal pore structure of the electrode material, it is possible to add pore-forming substances which must be removed before the electrode is used.

Thus, the object was to find a simplified process for the preparation of a catalytically active electrode material which does not involve disadvantageous reduction in size of the catalyst and nevertheless leads to a material of high catalytic activity.

The present invention achieves this object. A process for the preparation of a catalytically active electrode material for oxygen-consuming electrodes has been found, in which process metallic silver is deposited from a silver salt solution by reduction, and which comprises mixing (a) an aqueous dispersion of an organic polymer,
(b) a silver salt solution and
(c) a reducing agent for silver(I) ions and during this maintaining a pH at which the dispersion employed is stable and the silver salt is reduced.

Having regard to the further processing of the catalytically active material into an electrode, it is advantageous for the organic polymer employed to be thermoplastic. In this case, it is possible by sintering, that is to say by compressing under the action of heat, to process the catalyst material, which initially results in the form of a powder, to produce plate-shaped items.

The process according to the invention provides particularly efficient electrodes, that is to say electrodes having a high saving in voltage and little risk of "drowning", when the polymer employed is hydrophobic. In this context, a "hydrophobic" polymer is understood to be a product which contains no polar groups conferring solubility in water (hydroxyl, carboxylic acid and sulfonic acid groups). It is possible to use homopolymers, such as polyethylene and polypropylene, or copolymers which derive from, for example, styrene/butadiene acrylonitrile. Polymers which derive from unsaturated halogenated hydrocarbons by polymerization are preferred, such as, for example, PVC. Saturated fluorinated hydrocarbons, such as polytetrafluoroethylene, are particularly preferred as polymers.

In general, aqueous dispersions of an organic polymer are employed, since in these cases the reduction and the further processing take their simplest forms. In the stable aqueous dispersion used, the organic polymers behave as hydrophiles because of the dispersing auxiliaries which are also present. Most of these auxiliaries are removed on thoroughly washing the electrode material containing silver. The last residues are destroyed during the production of the electrodes by sintering. If these auxiliaries were not removed, the electrode would soon "drown" and lose effectiveness.

It is advantageous to add the silver salt solution, which is used for reduction, slowly to the reaction mixture, since then the proportion of the silver which is deposited on the surface of the polymer particles reaches a maximum, and the catalytic properties of the electrode material are better. In addition, the silver then has a more homogeneous distribution and a larger surface area.

The compounds employed as the silver salt are those which are soluble in water. Silver nitrate is preferred.

Many reducing agents for the reduction of silver from silver salts are known in practice. It is possible to reduce with, for example, hydrazine, hydroxylamine or sodium borohydride. Moreover, the pH of the reaction mixture should be set depending on the reducing agent. The stability of the dispersion employed should be taken into account for this. For example, a reducing agent which is only effective in an acid medium should not be used if the dispersion is unstable under these conditions. Reduction with formaldehyde, which takes place at pH 7-11, in particular pH 9-10, has proved suitable for the process according to the invention.

It is advantageous to carry out the deposition of silver according to the invention at low reaction temperatures, since then the deposit of silver is more finely divided and more catalytically active. Reaction temperatures of 0°-50° C., preferably 0°-15° C., have proved to be suitable.

The use of an aqueous dispersion of a polytetrafluoroethylene (PTFE) having a particle size between 0.1 and 0.5 micrometers is particularly preferred for the process according to the invention. This dispersion is stable in the approximate pH range 4–11, depending on the surfactants used. In a more alkaline medium, premature flocculation of the polymer usually occurs, and this leads to a coarse aggregate. This is no longer suitable for the production of electrodes. Thus, it is essential continuously to monitor the pH during the addition of the reducing agent. In this case, an upper limit of 10 to the pH to be maintained, and in particular a pH range of 9–10, has proved to be particularly suitable.

In general, an aqueous, neutral or weakly acid solution of a silver salt is added dropwise to an aqueous dispersion of PTFE, with cooling and vigorous stirring, together with a reducing agent and an agent for maintaining the pH. For the latter purpose, with most reducing agents an aqueous solution of alkali, for example an alkali metal hydroxide solution, will be added.

The solids content of the dispersion should not be too high, since otherwise a thick paste is produced when silver is deposited. Thus, dispersions having a high solids content (for example more than 35% by weight) should first be diluted with water (for example to 20% by weight).

It is also possible to mix the reducing agent and the dispersion of PTFE and add a silver salt solution and the agent for maintaining the pH (for example KOH) dropwise to the mixture which has been initially introduced. It is frequently possible with this variant to dispense with diluting the dispersion.

After reduction is complete, the polymer dispersion with deposited silver is separated from the supernatant mother liquor, and the precipitate is worked up, by washing and drying, to produce the finished electrode material. The drying should remove the adherent liquid phase. It is possible to dry in a drying oven at 90°–110° C. The electrode material should not sinter while drying. A very finely powdered product, which can be used without further steps to reduce the size, is obtained. After drying, it can be stored for a prolonged period without any loss in catalytic activity.

It is possible to reduce the added silver salt to silver in the theoretical yield. Moreover, the proportion of silver in the resulting electrode material can be controlled within wide limits by the amount of the silver salt which is metered in and reduced. In general, the proportion of silver in the final product will be between 20 and 90% by weight of the total mixture. A proportion of silver of 70 to 85% by weight is particularly preferred. Accordingly, in respect of the amounts of starting materials, a preferred weight ratio of silver to the solids in the organic dispersion is 20:80 to 90:10. A ratio of 70:30 to 85:15 is particularly preferred.

It is also possible to add heavy metal salts to the silver salt solution. Salts of metals which are not attacked by alkali metal hydroxides, such as Ni, Bi, Pt, Ru, Pd, Au, Cu and Hg, are preferred. It is possible in this manner to deposit catalytically active silver alloys onto the particles of synthetic material.

It is an advantage of the process according to the invention that the deposition of silver and the preparation of the silver/polymer mixture takes place in a single operation. This leads to a saving in operations (for example for reducing in size) and chemicals. The high activity of the product obtained in this manner is surprising.

The invention is illustrated in detail by the examples which follow.

EXAMPLE 1

80 ml of water and 30 ml of a 35% strength solution of formaldehyde are added to 4.7 g of a commercial 40% strength aqueous dispersion of polytetrafluoroethylene (tradename Hostaflon ® TF 5033), and this mixture is cooled to 0° to 10° C. To this is added dropwise, over the course of about one hour, a solution of 16.7 g of silver nitrate in 130 ml of water and 130 ml of a 10% strength potassium hydroxide solution. The reaction mixture is vigorously mixed during the dropwise addition; the reaction temperature should not exceed 15° C. The metering in of the potassium hydroxide solution must be carried out such that the pH does not rise above 10; the pH should not fall below 7.5. After reaction is complete, the precipitate which has formed is allowed to settle and the supernatant mother liquor is decanted off. The remaining solid is washed first with 100 ml of water and then with 200 ml of petroleum ether, and the electrode material thus obtained is dried at 120° C. (yield 12.3 g).

The silver content in the material thus prepared is about 85% by weight.

To produce an air cathode, 1.4 g of the electrode material is suspended in 10 ml of isopropanol. The suspension thus obtained is poured into a membrane filter having an internal diameter of 4.2 cm, and the alcohol is removed by suction. The resulting filter cake is then pressed under a pressure of about 65 bar into a silvered nickel wire gauze (mesh size=0.25 mm, d=0.16 mm) which later serves as the conductor of current. After drying at 100° C., the electrode is sintered at 250° C. in a muffle furnace for 15 minutes (atmosphere: air). The electrode is tested using a cell made of transparent polyacrylate arranged as a half-cell. On the cathode side, away from the catholyte, there is a chamber through which is passed $O_2$ or air. This type of cathode with a chamber is known from, for example, U.S. Pat. No. 3,926,765. The potential of the electrode in 33% strength sodium hydroxide solution at 80° C. is measured versus a saturated calomel electrode (SCE) as reference electrode.

The table below summarizes the potential distribution of the tested electrode.

TABLE 1

Electrode potentials versus SCE in 33% strength sodium hydroxide solution at 80° C.

| Current density i [kA/m$^2$] | Potential ε vs SCE [mV] | |
| --- | --- | --- |
| | $O_2$ | Air |
| 0.5 | 175 | 310 |
| 1.0 | 230 | 390 |
| 1.5 | 270 | 460 |
| 2.0 | 300 | 530 |
| 2.5 | 340 | 590 |
| 3.0 | 370 | 650 |
| 3.5 | 400 | 710 |
| 4.0 | 430 | 750 |

EXAMPLE 2

3 g of a commercial 60% strength aqueous dispersion of polytetrafluoroethylene (tradename: Hostaflon ® TF 5032) are diluted with 150 ml of water and cooled to 0° to 10° C. To this is added dropwise, over the course of about one hour, a solution of 11.3 g of silver nitrate in 100 ml of water, which contains 20 ml of 35% strength formaldehyde, and 30 ml of a 12 molar aqueous potassium hydroxide solution. The reaction mixture is vigorously mixed during the dropwise addition, and the reaction temperature should not exceed 15° C. The metering in of the potassium hydroxide solution must be carried out such that the pH does not rise above 10; the pH should not fall below 7.5. After reaction is complete, the precipitate which has formed is allowed to settle, and the supernatant mother liquor is decanted off. The remaining solid is washed, the wash water is removed by suction and the electrode material thus obtained is dried at 120° C. (yield: 8.8 g). The silver content in the material thus prepared is about 80% by weight.

To produce an air cathode, 1 g of the electrode material is suspended in about 10 ml of isopropanol. The resulting suspension is poured into a membrane filter having an internal diameter of 4.2 cm, and the alcohol is removed by suction. The resulting filter cake is then pressed with a force of 2.8 t into a gold-plated nickel wire gauze which later serves as the conductor of current. After drying at 90° C., the electrode is sintered in a muffle furnace (atmosphere: air) at 280° C. for 45 minutes. A half-cell arrangement is used to test the electrode. The potentials versus a saturated calomel electrode (SCE) are measured in 20 and 33% strength sodium hydroxide solution at a temperature of 80° C.

The table below summarizes the potential distribution of the tested electrode.

TABLE 2

Electrode potentials versus SCE in 20 and 33% strength sodium hydroxide solutions at 80° C.

| Current density i [kA/m$^2$] | Potential $\epsilon$ vs SCE (20% NaOH) [mv] | | Potential $\epsilon$ vs SCE (33% NaOH) [mV] | |
| --- | --- | --- | --- | --- |
| | O$_2$ | Air | O$_2$ | Air |
| 0.5 | 170 | 230 | 195 | 290 |
| 1.0 | 200 | 300 | 240 | 360 |
| 1.5 | 225 | 370 | 260 | 420 |
| 2.0 | 250 | 440 | 290 | 500 |
| 2.5 | 265 | 500 | 320 | 580 |
| 3.0 | 290 | 570 | 340 | 650 |
| 3.5 | 310 | 610 | 360 | 750 |
| 4.0 | 320 | 660 | 370 | 850 |

EXAMPLE 3

240 ml of water and 45 ml of a 35% strength solution of formaldehyde are added to 12.5 g of an aqueous dispersion of polytetrafluoroethylene (tradename Hostaflon ® TF 5033—40%), and the mixture is cooled to 0° to 10° C. To this is added dropwise, over the course of about 1.5 hours, a solution of 27.7 g of silver nitrate and 3.9 g of mercury(II) nitrate in 380 ml of water, and 250 ml of a 10% strength sodium hydroxide solution. The reaction mixture is vigorously mixed during the dropwise addition; the reaction temperature should not rise above 15° C. The metering in of the potassium hydroxide solution must be carried out such that the pH does not rise above 10; the pH should not fall below 7.5. After reaction is complete, the precipitate which has formed is allowed to settle, the supernatant mother liquor is decanted off, and the remaining solid is washed first with water and then with petroleum ether. After drying at 110° C., the yield of catalyst material is 24.7 g. The silver content of the material thus prepared is about 70% by weight, and the mercury content is about 10% by weight.

An electrode is produced in analogy to Example 1 and tested in a half-cell. The table below summarizes the potential distribution of the tested electrode.

TABLE 3

Electrode potential versus SCE in 33% strength sodium hydroxide solution at 80° C.

| Current density i [kA/m$^2$] | Potential $\epsilon$ vs SCE [mV] | |
| --- | --- | --- |
| | O$_2$ | Air |
| 0.5 | 160 | 250 |
| 1.0 | 210 | 320 |
| 1.5 | 250 | 440 |
| 2.0 | 280 | 540 |
| 2.5 | 300 | 690 |
| 3.0 | 340 | 820 |
| 3.5 | 360 | |
| 4.0 | 390 | |

COMPARISON EXAMPLE

An electrode was produced according to a procedure in German Pat. No. 2,713,855 (column 4, lines 14–35) and tested in a half-cell.

The table below summarizes the potential distribution of the tested electrode.

TABLE 4

Electrode potentials versus SCE in 33% strength sodium hyroxide solution at 80° C.

| Current density i [kA/m$^2$] | Potential $\epsilon$ vs SCE [mV] | |
| --- | --- | --- |
| | O$_2$ | Air |
| 0.5 | 200 | 450 |
| 1.0 | 280 | 650 |
| 1.5 | 350 | 790 |
| 2.0 | 410 | 860 |
| 2.5 | 460 | 940 |
| 3.0 | 530 | 1170 |
| 3.5 | 580 | |
| 4.0 | 620 | |

EXAMPLE 4

560 ml of water and 90 ml of a 35% strength formaldehyde solution are added to 18.8 g of an aqueous dispersion of polytetrafluoroethylene (tradename Hostaflon ® TF 5033—40%), and the mixture is cooled to 0° to 10° C. To this is added dropwise, over the course of about 4 hours, a solution of 60.64 g of silver nitrate and 6.48 g of mercury(II) nitrate in 900 ml of water, and about 600 ml of a 10% strength potassium hydroxide solution. The reaction mixture is vigorously mixed during the dropwise addition, and the reaction temperature should not exceed 15° C. The metering in of the potassium hydroxide solution should be carried out such that the pH does not rise above 10 and does not fall below 7.5. After reaction is complete, the precipitate which has formed is allowed to settle, the supernatant clear mother liquor is decanted off, and the remaining solid is washed first with water and then with petroleum ether. After drying at 110° C., the yield of catalyst material is 49.4 g (=99% of theory). The silver content in the material thus prepared is about 77% by weight, and the mercury content is about 8% by weight.

An electrode is produced from this material and tested in a half-cell in analogy to Example 1. The table below summarizes the potential distribution of the tested electrode.

TABLE 5

| Electrode potential versus SCE in 35% strength sodium hydroxide solution at 80° C. | | |
| --- | --- | --- |
| Current density i [kA/m$^2$] | Potential ε vs SCE [mV] | |
| | O$_2$ | Air |
| 0.5 | 150 | 240 |
| 1.0 | 180 | 320 |
| 1.5 | 225 | 385 |
| 2.0 | 240 | 460 |
| 2.5 | 265 | 540 |
| 3.0 | 280 | 600 |
| 3.5 | 305 | 660 |
| 4.0 | 330 | 700 |

EXAMPLE 5

150 g of a catalyst material composed of 77% by weight of silver and 8% of mercury are moistened with isopropanol such that a pasty composition which flows readily is produced. This composition is distributed with a uniform layer thickness on a nickel wire gauze of width 16 cm and length 58 cm, and the catalyst material is pressed into the nickel wire gauze with a force of 40 t. The crude electrode thus produced is dried at 110° C. for one hour and then heat-treated at temperatures between 180° and 210° C. for 4 hours.

The finished electrode is incorporated in an alkali metal chloride membrane electrolysis cell which has a working area of width 9 cm and height 50 cm. The electrolysis cell is operated such that, at a temperature of 85° C., 33% by weight sodium hydroxide solution is produced and the salt solution is depleted from about 300 g/l NaCl to about 200 g/l NaCl. Oxygen is used in a stoichiometric amount as the depolarizing gas. Within a test period lasting 7.5 months at a current density of 2 kA/m$^2$, the cell voltage rose from 2.15 V to 2.20 V. It was still perfectly possible to use the electrode even after this. The mean energy consumption in this period was about 1600 kWh/t of NaOH with a current yield of about 92%.

I claim:

1. A process for the preparation of a catalytically active electrode material for oxygen-consuming electrodes containing metallic silver obtained by reduction from a silver salt solution which comprises mixing in a mixing zone (a) an aqueous stable dispersion of dispersed hydrophobic organic polymer particles having a particle size within the range of about 0.1–0.5 micrometers, said dispersion containing a surfactant as dispersing auxiliary, (b) an aqueous alkaline silver salt solution, and (c) a reducing agent for silver (I) ions; maintaining throughout the duration of the mixing step a pH in the range of 4–11, at which pH the dispersion employed is stable and silver ions are reduced; reducing the silver salt to metallic silver at 0° to 50° C., whereby metallic silver is deposited on the hydrophobic organic polymer; and collecting the resulting precipitate containing hydrophobic organic polymer particles of said particle size and 20–90% by weight metallic silver, the weight ratio of silver to solids in the organic dispersion being in the range of 20:80 to 90:10, both in the starting mixture and in the resulting precipitate.

2. The process as claimed in claim 1, wherein the dispersing auxiliary is removed from the electrode material by washing the resulting silver containing electrode material.

3. The process as claimed in claim 1, wherein the solids content of the aqueous stable dispersion is at most about 20% by weight.

4. A process for the preparation of a catalytically active electrode material for oxygen-consuming electrodes containing metallic silver obtained by reduction from a silver salt solution, which comprises combining the components comprising (a) an aqueous stable dispersion of hydrophobic organic polymer particles having a particle size within the range of about 0.1–0.5 micrometers, said dispersion containing a surfactant as dispersing auxiliary, (b) a reducing agent for silver (I) ions, and (c) an aqueous alkaline silver salt solution, said silver salt solution being slowly added to the other components, maintaining throughout the duration of the combining step a pH, in the range of 4–11, at which the dispersion employed is stable and silver ions are reduced; reducing the silver salt to metallic silver at 0° to 50° C., whereby metallic silver is deposited on the hydrophobic organic polymer; and collecting the resulting precipitate containing organic polymer of said particle size and 20–90% metallic silver, the weight ratio of silver to solids in the organic dispersion being in the range of 20:80 to 90:10, both in the starting materials and in the resulting precipitate.

5. A process for the preparation of a catalytically active electrode material for oxygen-consuming electrodes, in which metallic silver is deposited by reduction from a silver salt solution, which comprises mixing an aqueous stable dispersion of polytetrafluoroethylene particles having a particle size within the range of about 0.1–0.5 micrometers, said dispersion containing a surfactant as dispersing auxiliary, an aqueous alkaline silver salt solution, and a reducing agent for silver (I) ions, maintaining throughout the mixing step the resulting mixture as it is being formed at a pH, within the range of 4–11, at which the dispersion employed is stable and silver ions are reduced; reducing the silver salt to metallic silver at 0° to 50° C., whereby metallic silver is deposited on the polytetrafluoroethylene particles; and collecting the precipitate formed containing polytetrafluoroethylene particles of said particle size and 20–90% by weight metallic silver; the weight ratio of silver to solids in said dispersion being in the range of 20:80 to 90:10, both in the resulting mixture and in the precipitate which is formed therefrom.

6. A process as claimed in claim 5, wherein said mixing step comprises adding an aqueous solution of an alkali and the silver salt solution to a previously combined mixture comprising the aqueous stable dispersion and the reducing agent.

7. A process as claimed in claim 5, wherein said mixing step comprises adding to the aqueous stable dispersion of polytetrafluoroethylene the silver salt solution together with the reducing agent and an aqueous solution of alkali for maintaining the pH during said mixing step.

8. A process as claimed in claim 5 wherein a pH of from 9 to 11 is maintained in the mixture during said mixing step.

9. A process as claimed in claim 5 wherein the solids content of the dispersion of polytetrafluoroethylene is at most about 20% by weight.

10. The process as claimed in claim 5, which comprises conducting the reduction reaction which occurs during the mixing step at a temperature of from 0° to 15° C.

11. The process as claimed in claim 5, wherein formaldehyde is used as the reducing agent.

12. A process for the preparation of a catalytically active electrode material for oxygen-consuming electrodes, in which metallic silver is deposited by reduction from a silver salt solution, which comprises
mixing (a) an aqueous stable dispersion of dispersed polytetrafluoroethylene particles having a particle size between 0.1 and 0.5 micrometers and a surfactant as dispersing auxiliary, (b) an aqueous alkaline silver salt solution, and (c) a reducing agent for silver (I) ions, the weight ratio of silver to said solids being from 20:80 to 90:10, maintaining in the resulting mixture as it is being formed throughout the mixing step, a pH, in the range of 4–11, at which the dispersion employed is stable and silver ions are reduced whereby metallic silver is deposited on the polytetrafluoroethylene particles and collecting the thus-formed precipitate, which contains polytetrafluoroethylene particles of said particle size and 20–90% by weight metallic silver.

13. The process as claimed in claim 12, wherein said weight ratio is from 70:30 to 85:15.

* * * * *